Oct. 11, 1938.  J. L. GREEN  2,132,950
SELF LOCKING RIVET
Filed May 15, 1937
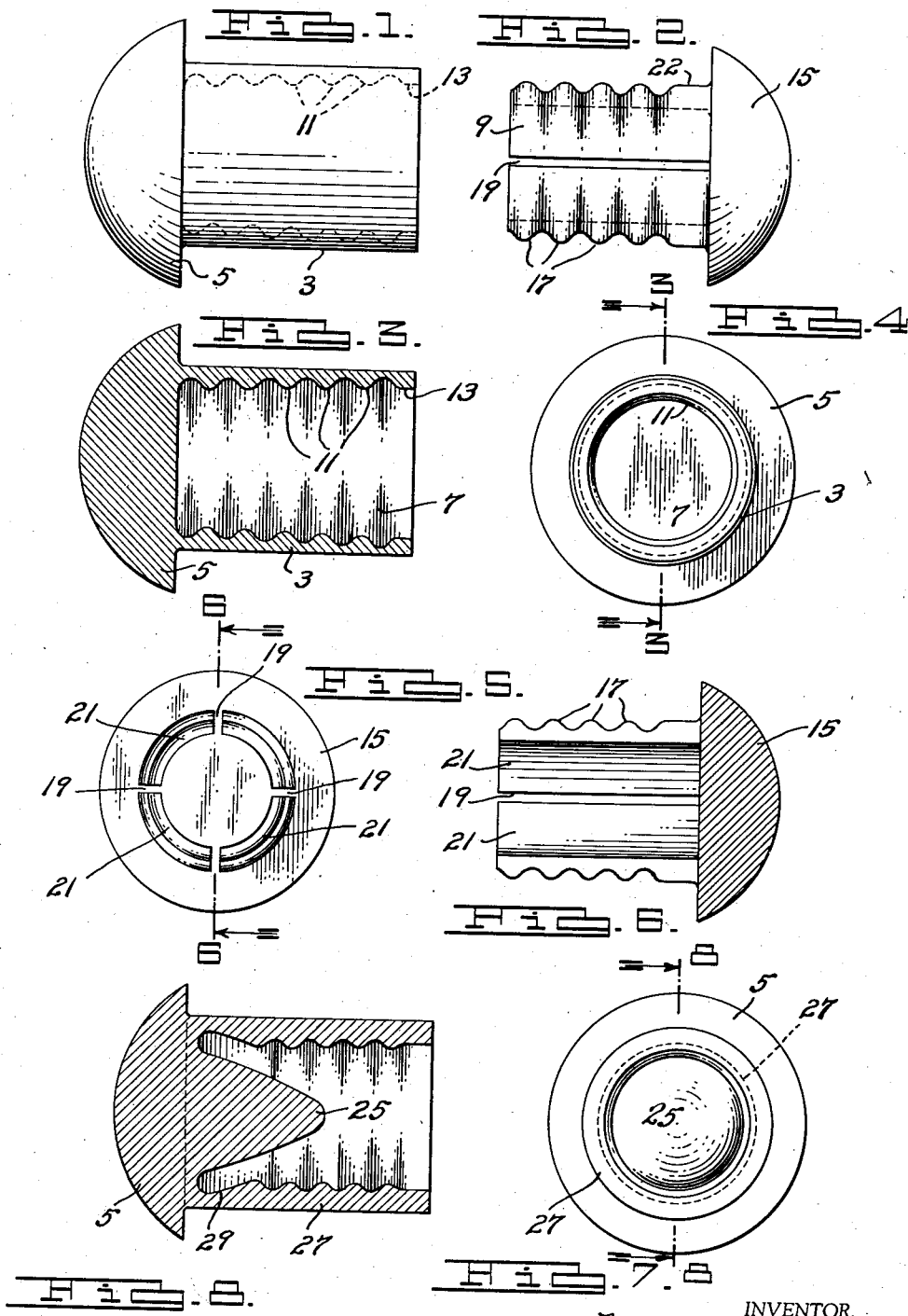
INVENTOR.
James L. Green
BY
J. J. Hicks
ATTORNEY.

Patented Oct. 11, 1938

2,132,950

UNITED STATES PATENT OFFICE 2,132,950

SELF-LOCKING RIVET

James L. Green, Cleveland, Ohio, assignor to The Indemse Corporation, a corporation of Michigan Application May 15, 1937, Serial No. 142,786

5 Claims. (Cl. 85—4)

My invention pertains to self-locking rivets and more particularly to hollow rivets which telescope together in frictional self-holding relation.

It is an object of my invention to provide improved self-holding rivets which may be attached with ordinary tools, without riveting in the ordinary sense whereby the metal of the rivets retains its full strength, and which may be adjustably joined for securing together metal and other materials of variable thickness, to replace bolts, screws and other fastening means.

It is also an object of my invention to provide self-locking rivets comprising a tubular body, frictional projections or flutes spaced along on the inside surface of the tubular body, a head on one end of the body, a smaller tubular body of a suitable diameter for telescoping into the first mentioned body, flutes or ridges spaced along the outer surface of the second body for fitting between and frictionally engaging the flutes on the first body, and a head on the other end of the smaller tubular body, whereby the rivets may be conveniently applied by pressing the telescoping body members together and drawing the heads together to secure and clamp material disposed therebetween.

It is a further object of my invention to provide such rivets having a tapered bore in the larger tubular body and slots in the inner end of the smaller tubular body to provide inwardly directed resilient fingers cooperating with the frictional retaining means.

Another object of my invention is to provide such self-locking rivets which also have auxiliary locking means comprising a conical spreader carried by the head portion of the larger tubular body for spreading the inner ends of the fingers on the smaller body as it is telescoped therein to aid the flutes in securing the two parts of the rivets together.

The novel features that I consider characteristic of my invention are set forth with particularity in the appended claims. The invention itself, however, both as to its organization and its method of application, together with additional objects and advantages thereof, will best be understood from the following description of specific embodiments, when read in conjunction with the accompanying drawing, in which:

Fig. 1 is a side elevational view of the larger or outer half of my self-locking rivet, the conformation of the inner surface being represented by dotted lines;

Fig. 2 is a similar view showing the smaller half of the rivet as it is disposed for telescoping into the larger half shown in Fig. 1;

Fig. 3 is a longitudinal sectional view of the outer half of the rivet taken on line 3—3 of Fig. 4;

Fig. 4 is an end elevation of the open end of the outer half of the rivet;

Fig. 5 is an end elevational view of the open end of the smaller half of the rivet;

Fig. 6 is a sectional view on line 6—6 thereof;

Fig. 7 is an end elevational view of the open end of another embodiment of the larger half of my rivet; and Fig. 8 is a sectional view on line 8—8 thereof.

Referring more specifically to the drawing, I have illustratively disclosed one embodiment of my self-locking rivet in Figs. 1-6, to which particular reference will now be made.

The larger or outer half of my self-locking rivet as shown in Figs. 1, 3 and 4, comprises a hollow or tubular support member or body 3 of any suitable metal or alloy, and it carries a material clamping head 5 at one end. The bore or aperture 7 in the body tapers to a smaller diameter toward the headed end of the rivet. The taper of the diameter of this internal bore is preferably at a uniform rate which may be selected according to the purpose for which the rivet is to be used. Generally I have found a diminution of $\frac{1}{32}$nd inch per inch of rivet to be satisfactory. The headed end of the rivet body is preferably closed by the head, as shown.

The inner surface of the outer half 3 of the rivet being thus tapered effectively grips the smaller half 9 of the rivet which telescopes therein. In order to improve the frictional gripping characteristics of this inner surface I provide frictional projections thereon and for this purpose I find it preferable to provide a plurality of axially spaced ridges or flutes 11 of substantially annular conformation on the tapered inner surface of the outer rivet body 3.

I have found that a pitch and depth of $\frac{1}{32}$nd inch is most satisfactory from the point of view of facilitating attachment of the rivet and is also quite satisfactory for holding the rivet firmly together. A shoulder 13 is provided in the rivet body for a purpose to be subsequently set forth. This shoulder is preferably of a length of about $\frac{1}{8}$ to $\frac{1}{4}$ the depth of the bore.

The small inner half of the rivet, shown in Figs. 2, 5 and 6, comprises a hollow or tubular rivet body 9 of a diameter suitable for telescoping into the large or outer body member, as shown, and carrying a material clamping head 15 on one end. On the outer surface of this body I provide axially spaced ridges or flutes 17 which are of a pitch and depth corresponding to the flutes provided on the inside of the outer rivet body 3, as above set forth.

Any desired number of slots 19 are split back from the end of the body to provide resilient fingers 21 thereon. For this purpose the end of the smaller rivet body 9 is preferably split two or four ways from the end of the shank back to the head 15 so that it will compress when the small part of the rivet is forced into the tapered bore 7 of the outer portion of the rivet.

The body 9 of the smaller half of the rivet has a shoulder 22, shown in Fig. 2, which fits into the shoulder 13 of the outer half of the rivet. The purpose of the interfitting shoulders is to prevent the two halves of the rivet from wobbling relative to one another after they are telescoped together.

My rivets may be utilized for securing together parts or sheets of metal or other material, and are applied by insertion through properly aligned holes in the sheets or parts to be clamped together. For this purpose the large outer half of the rivet is first inserted, and then the small half of the rivet is inserted into the larger half from the opposite direction. Sufficient force is then applied, as by squeezing, pressing or hammering to force the two halves of the rivet together and also the clamping heads carried thereby. The material to be secured can easily be protected from excessive pressure by properly limiting the pressure applied for pushing the halves of the rivets together.

Metal or other materials of varying thicknesses can be held together through the use of my rivets because it is not necessary that the head of the rivet be pushed to a definite limit in order to insure locking of the rivets.

My rivets can be attached with ordinary tools, and because they do not require riveting in the ordinary sense of the word the metal of the rivets is not weakened by hammering.

Auxiliary locking means may be utilized to strengthen the holding power of my rivets by the arrangement shown in Figs. 7 and 8. In this embodiment of my invention a conical spreader 25 is axially disposed from the head 5 of a rivet body 27, and the inner surface of the body is flared as at 29 in spaced relation adjacent the cone 25. For this purpose the diameter of the bore preferably increases at a rate of about $\frac{1}{16}$ inch per inch of shank length for a distance from the head approximately ⅓ the depth of the bore.

In use the smaller rivet body 9 is forced into this large tubular body 27 in a manner substantially similar to that described above with reference to the first embodiment.

In this embodiment the rivet is locked together through the frictional engagement on the side of the tapered bore, as in the modification previously described, and also through the spreading of the ends of the split fingers 21 of the inside half of the rivet when these are opened by the cone 25 in the outer rivet body.

Either embodiment of my self-locking rivet may be made of suitable shapes and proportions for different purposes and may be provided with heads which are round, square, hexagonal or cone shaped as will be readily understood, and is an ideal mechanical fastener which may be applied conveniently with ordinary tools for many useful purposes.

Although I have shown and described certain specific embodiments of my invention, I am fully aware that many modifications thereof are possible. My invention, therefore, is not to be restricted except insofar as is necessitated by the prior art and the spirit of the appended claims.

I claim:

1. A self-locking rivet comprising, a tubular body having a tapered inside bore, frictional projections on the tapered inside surface of said tubular body, a material clamping head on the end of said body adjacent the smaller end of the tapered bore, a smaller tubular body of a diameter suitable for telescoping into the first mentioned body, a material clamping head on one end of said smaller body, frictional projections on the outer surface of the smaller body for frictionally engaging the projections on the inner surface of the other body to secure said bodies in telescoped relation for clamping material between said clamping heads, and slits in the inner end of said smaller body to provide inwardly directed resilient fingers thereon.

2. A self-locking rivet comprising, a tubular body having a tapered inside bore, frictional projections on the tapered inside surface of said tubular body, a material clamping head on the end of said body adjacent the smaller end of the tapered bore, a smaller tubular body of a diameter suitable for telescoping into the first mentioned body, a material clamping head on one end of said smaller body, frictional projections on the outer surface of the smaller body for frictionally engaging the projections on the inner surface of the other body to secure said bodies in telescoped relation for clamping material between said clamping heads, slots in the inner end of said smaller body to provide inwardly directed resilient fingers thereon, and auxiliary locking means comprising a spreader carried in the head end of the larger tubular body for spreading the inner ends of the inwardly directed fingers of the smaller tubular body.

3. A self-locking rivet comprising, a tubular body having a tapered inside bore, frictional annular flutes spaced along on the tapered inside surface of said tubular body, a material clamping head on the end of said body adjacent the smaller end of the tapered bore, a smaller tubular body of a diameter suitable for telescoping into the first mentioned body, a material clamping head on one end of said smaller body, frictional annular flutes spaced along on the outer surface of the smaller body for frictionally engaging the flutes on the inner surface of the other body to secure said bodies in telescoped relation for clamping material between said clamping heads, slots in the inner end of said smaller body to provide inwardly directed resilient fingers thereon, and auxiliary locking means comprising a spreader carried in the head end of the larger tubular body for spreading the inner ends of the inwardly directed fingers of the smaller tubular body.

4. A self-locking rivet comprising, a tubular body having a tapered inside bore, frictional projections on the tapered inside surface of said tubular body, a material clamping head on the end of said body adjacent the smaller end of the tapered bore, a smaller tubular body of a diameter suitable for telescoping into the first mentioned body, a material clamping head on one end of said smaller body, frictional projections on the outer surface of the smaller body to secure said bodies in telescoped relation for clamping material between said clamping heads, slits in the inner end of said smaller body to provide inwardly directed fingers, and at least one of said tubular bodies having a shoulder surface disposed for snugly engaging a portion of the other tubular body to eliminate wobbling and slack motion between said bodies.

5. A self-locking rivet comprising, a tubular body having a tapered inside bore, frictional projections on the tapered inside surface of said tubular body, a material clamping head on the end of said body adjacent the smaller end of said bore, a smaller tubular body of a diameter suitable for telescoping into the first mentioned body, a material clamping head on one end of said smaller body, frictional projections on the outer surface of the smaller body for frictionally engaging the friction projections on the inner surface of the other body to secure said bodies in telescoped relation for clamping material between said clamping heads, slits in the inner end of said smaller body to provide inwardly directed resilient fingers, at least one of said tubular bodies having a shoulder surface disposed for snugly engaging a portion of the other tubular body to eliminate wobbling and slack motion between said bodies; and auxiliary locking spreader means in the head end of the larger tubular body for spreading the inner ends of the inwardly directed fingers of the smaller body.

JAMES L. GREEN.